US008201197B1

(12) United States Patent
Holliday et al.

(10) Patent No.: US 8,201,197 B1
(45) Date of Patent: Jun. 12, 2012

(54) TELEVISION RECEIVER UTILIZING EXTENDED SERVICE INFORMATION

(75) Inventors: David Holliday, Middlesex (GB); Robin Crossley, Middlesex (GB); Nicholas James, Middlesex (GB)

(73) Assignee: British Sky Broadcasting Limited, Isleworth, Middlesex (GB)

( * ) Notice: Subject to any disclaimer, the term of this patent is extended or adjusted under 35 U.S.C. 154(b) by 887 days.

(21) Appl. No.: 09/719,389

(22) PCT Filed: Jun. 14, 1999

(86) PCT No.: PCT/GB99/01873
§ 371 (c)(1),
(2), (4) Date: Jun. 25, 2001

(87) PCT Pub. No.: WO99/66721
PCT Pub. Date: Dec. 23, 1999

(30) Foreign Application Priority Data

Jun. 12, 1998  (GB) .................................. 9812797.0

(51) Int. Cl.
*G06F 3/00* (2006.01)
(52) U.S. Cl. ................ 725/39; 725/56; 725/57; 725/58; 725/59; 715/700; 707/999.101
(58) Field of Classification Search .............. 725/39–61; 707/999.101; 715/700
See application file for complete search history.

(56) References Cited

U.S. PATENT DOCUMENTS

| 5,371,550 | A |   | 12/1994 | Shibutani et al. |
| 5,548,338 | A | * | 8/1996  | Ellis et al. ........................ 725/54 |
| 5,579,055 | A | * | 11/1996 | Hamilton et al. ............... 725/49 |
| 5,585,866 | A |   | 12/1996 | Miller et al. |
| 5,619,274 | A |   | 4/1997  | Roop et al. |

(Continued)

FOREIGN PATENT DOCUMENTS

EP            0705036 A2    4/1996

(Continued)

OTHER PUBLICATIONS

"Decoder." Microsoft Press Computer Dictionary. 3rd ed. 1997.*

(Continued)

*Primary Examiner* — Farzana Hossain
(74) *Attorney, Agent, or Firm* — Rothwell, Figg, Ernst & Manbeck PC

(57) ABSTRACT

A receiver for receiving television signals is arranged to receive signals in a plurality of channels. Each signal defines a television program and at least a signal in one of the channels comprises compressed data defining broadcast events in the channels from time to time. The receiver is arranged to produce output signals defining an image of events in the program schedule for displaying on a television screen. The receiver comprises means for receiving data defining a dictionary representing text portions, means for decoding the program scheduling data to identify text portions in the dictionary, and means for constructing the image of events from the identified text portions. A signal in each channel comprises a bouquet identity and a sub-bouquet identity for the channel. The receiver comprises means for storing a reference bouquet identity and one or more reference sub-bouquet identities, means for comparing the bouquet identity and sub-bouquet identity for a channel in a received signal with the reference bouquet and sub-bouquet identities and means for outputting the received television signal for display of the program or other services defined thereby depending on the comparison.

18 Claims, 6 Drawing Sheets

U.S. PATENT DOCUMENTS

| | | | |
|---|---|---|---|
| 5,635,989 A | | 6/1997 | Rothmuller |
| 5,684,525 A | * | 11/1997 | Klosterman ............... 725/48 |
| 5,760,821 A | * | 6/1998 | Ellis et al. ............... 725/50 |
| 5,801,753 A | * | 9/1998 | Eyer et al. ............... 725/50 |
| 5,808,694 A | * | 9/1998 | Usui et al. ............... 725/49 |
| 5,841,433 A | * | 11/1998 | Chaney ............... 725/50 |
| 5,844,620 A | * | 12/1998 | Coleman et al. ............... 725/54 |
| 5,883,677 A | * | 3/1999 | Hofmann ............... 348/584 |
| 5,886,995 A | * | 3/1999 | Arsenault et al. ............... 370/477 |
| 5,911,046 A | * | 6/1999 | Amano ............... 725/103 |
| 5,982,411 A | * | 11/1999 | Eyer et al. ............... 725/49 |
| 5,991,451 A | * | 11/1999 | Keith et al. ............... 382/246 |
| 6,028,599 A | * | 2/2000 | Yuen et al. ............... 725/50 |
| 6,072,983 A | * | 6/2000 | Klosterman ............... 725/49 |
| 6,147,714 A | * | 11/2000 | Terasawa et al. ............... 348/564 |
| 6,160,545 A | * | 12/2000 | Eyer et al. ............... 715/721 |
| 6,173,330 B1 | * | 1/2001 | Guo et al. ............... 709/232 |
| 6,418,556 B1 | * | 7/2002 | Bennington et al. ............... 725/40 |
| 2002/0116712 A1 | * | 8/2002 | Schein et al. ............... 725/58 |
| 2003/0200544 A1 | * | 10/2003 | Ellis et al. ............... 725/46 |
| 2004/0111745 A1 | * | 6/2004 | Schein et al. ............... 725/46 |
| 2005/0144638 A1 | * | 6/2005 | Allison et al. ............... 725/45 |
| 2005/0193413 A1 | * | 9/2005 | Ellis et al. ............... 725/45 |
| 2007/0271582 A1 | * | 11/2007 | Ellis et al. ............... 725/46 |

FOREIGN PATENT DOCUMENTS

| | | |
|---|---|---|
| EP | 0 746 153 A1 | 12/1996 |
| EP | 0772354 A2 | 5/1997 |
| EP | 0 822 718 A1 | 2/1998 |
| EP | 0 823 815 A2 | 2/1998 |
| JP | 08-102922 | 4/1996 |
| JP | 08-111823 | 4/1996 |
| WO | WO 94/13107 A1 | 6/1994 |
| WO | WO 96/07270 A1 | 3/1996 |
| WO | WO 96/37996 A1 | 11/1996 |
| WO | WO 97/23997 A1 | 7/1997 |
| WO | WO 97/47136 * | 12/1997 |
| WO | WO 97/49237 A1 | 12/1997 |
| WO | WO 98/06219 A1 | 2/1998 |

OTHER PUBLICATIONS

International Search Report.
English translation of Japanese Office Action in related Japanese Application No. 555433/200, 4 pages (Mar. 24, 2009).
European Patent Office Communication 94(3) EPC in corresponding European Patent Application No. 02077114.3, 6 pages (mailed Jun. 24, 2011).
European Patent Office Communication 94(3) EPC in corresponding European Patent Application No. 10184051.0, 5 pages (mailed Jan. 26, 2012).

* cited by examiner

TELEVISION RECEIVER UTILIZING EXTENDED SERVICE INFORMATION

The invention relates to improvements in receivers for television signals.

BACKGROUND OF THE INVENTION

At present most television broadcasting, regardless of medium over which the signal is broadcast (Terrestrial, Cable, Satellite), is analogue based and comprises a single television service (e.g. SKY ONE, SKY SPORTS, SKY MOVIES) transmitted on a carrier signal or channel. However, the use of digital based broadcast technology is imminent. Digital broadcast technology will enable television service companies to transmit in a single channel high definition television programmes, or plural programmes at conventional definition or multiple customer services, or a combination of these.

In a conventional analogue-based television broadcast system programmes (or "services") are broadcast by separate television service companies on a single carrier signal ("channel"). In a digital based broadcast system it is possible to broadcast plural services multiplexed together on a single carrier. Unless the context requires otherwise the term "channel" will be used herein to refer to the bandwidth used by a single service to broadcast television programmes or other customer services. The term "channel" therefore encompasses both an entire carrier signal (when the signal is used entirely by a single service) and a portion of a carrier signal (when the signal is shared by plural services).

The ability to transmit multiple channels in a single carrier signal enables a far greater number of services to be provided in the digital domain than is possible in the analogue domain. Some of the channels in a carrier may be used to provide conventional television programmes while simultaneously other channels in the carrier are used to provide data for other customer services such as television programme listings, on-line programme ordering or so-called pay-per-view (PPV) services, and so on. Customer services should not be confused with the "services" provided by television companies as discussed hereinabove.

In our International (PCT) patent application published as WO 96/37996, the teachings of which are incorporated herein by reference, there is disclosed a receiver for television signals, which receiver is arranged to receive video signals comprising video data, information data and audio signals comprising audio data and information data. The receiver is arranged to respond to viewer operation of a control device. The receiver includes a processor for processing selected information data to convert the same into signals representative thereof for output to a television in combination with the video signals. In one mode of operation the decoder responds to manipulation of the control device by causing brief scheduling information pertaining to programmes of a plurality of different TV signals to be displayed over the received signal. In another mode of operation the receiver is arranged to display detailed scheduling information pertaining to plural different television signals. The receiver is operable to receive signals containing video data representing a plurality of video clips. The processor is arranged to process the signals and to cause simultaneous display of the clips on a television screen. The processor is arranged to respond to user manipulation of the control device by storing data for subsequent viewing of user selected programmes. The decoder may further comprise a modem and various types of digital storage media including Hard Disk, CD-ROM drive, Digital Video Disk.

In addition to such television related services some of the channels in a carrier may be used to provide on-line shopping facilities by which a customer may purchase goods and/or services from their own home. Such on-line shopping is, of course, only possible if there is an element of interaction between the goods/service provider and the customer. The term "interactive services" will be used herein to refer generally to on-line shopping facilities and the like made available via one or more channels in a digital based broadcast system.

Digital data multiplexing techniques enable a single channel to carry simultaneously multiple interactive services. In itself this creates a problem. Many customers will find bewildering the large number of interactive services available to them. If customers become confused they will not make use of the interactive services. Clearly, this is undesirable.

Transmission bandwidth is a finite resource and will remain at a premium even if full advantage is taken of digital data compression techniques. This presents a problem when it comes to providing an interactive service. On the one hand it is desirable to present high quality pictures and graphics. However, higher quality necessitates the use of a larger bandwidth. On the other hand it is desirable to keep costs down because customers will not make use of interactive services if they are significantly more expensive than comparable high street services.

In our International (PCT) patent application published as WO 97/23997, the teachings of which are incorporated herein by reference, there is disclosed a receiver for television signals, which receiver is arranged to receive video signals comprising video data and information data. The receiver is arranged to respond to viewer operation of a control device. The receiver includes a processor for processing selected information data to convert the same into signals representative thereof for output to a television in combination with the video signals. The receiver is arranged to respond to the information data to output for display data derived from said image data and said information data and representing an inter-active image. The receiver is responsive to viewer manipulation of the control device to vary the inter-active image and to establish a telecommunications link to a remote site for on-line interaction via the inter-active image between the viewer and the remote site. The interactive image may form part of an interactive services interface comprising a broadcast entry level and plural broadcast interactive levels. The inter-active services interface may comprise one or more on-line interactive levels entered from one of the broadcast interactive levels for establishing an on-line connection with a remote site.

SUMMARY OF THE INVENTION

The present invention aims to facilitate the functionality and limit the bandwidth used for the transmission of schedule data in the decoder and EPG described in the aforementioned patent applications.

In one aspect the invention provides a receiver for receiving television signals in a plurality of channels each defining a television programme and at least a signal in one of the channels comprising or further comprising compressed data defining broadcast events in the channels from time to time, the receiver being arranged to produce output signals defining an image of events in the programme schedule for displaying on a television screen and comprising means for receiving data defining a dictionary representing text portions. means for decoding the programme scheduling data to identify text portions in the dictionary, and means for constructing the image of events using the identified text portions.

In another aspect the invention provides a receiver for receiving television signals in a plurality of channels each defining a television programme and/or other services provided by a broadcaster, and a bouquet identity and a sub-bouquet identity for the channel, the receiver comprising means for storing a reference bouquet identity and one or more reference sub-bouquet identities, means for comparing the bouquet identity and sub-bouquet identity for a channel in a received signal with the reference bouquet and sub-bouquet identities and means for outputting the received television signal for display of the programme or other services defined thereby depending on the comparison.

The ordering of the programmes or other services defined may also depend on the comparison.

In a further aspect the invention provides a receiver for receiving television signals in a plurality of channels each defining a television programme and wherein the signals further comprise sorting data defining a sorting list and scheduling data defining a schedule of programme events, the receiver being arranged to filter the scheduling data depending on the sorting data to produce output signals defining an image of selected events in the programme schedule for display as a filtered schedule on a television screen depending on the sorting data.

The invention also provides a receiver for receiving television signals in a first plurality of channels broadcast in a first broadcast network and a second plurality of channels broadcast in a second broadcast network, the receiver comprising a cache store for storing programme schedule data transmitted from time to time in at least one of the channels broadcast in the first network, means for decoding the data in the cache store for display of a programme schedule of the first broadcast network, and means for receiving and decoding programme schedule data transmitted substantially continuously in at least one of the channels broadcast in the second network.

The invention provides a receiver for receiving television signals for a plurality of channels which together provide a time-shifted service, the television signals comprising unique identity data for each channel and programme schedule data for a reference channel, the receiver comprising means for determining from the data for the reference channel a schedule for each other channel and means for displaying a schedule of programmes for each independently identified channel in the time shifted service.

The invention provides a receiver for receiving television signals in a plurality of channels each defining a television programme and at least a signal in one of the channels further comprising programme scheduling data including pay-per-view-events, the receiver being arranged to filter the data pertaining to the pay-per-view events to produce output signals defining an image of a schedule of the pay-per-view events for display on a television screen.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN
EMBODIMENT OF THE INVENTION

System Overview

Figure 1:
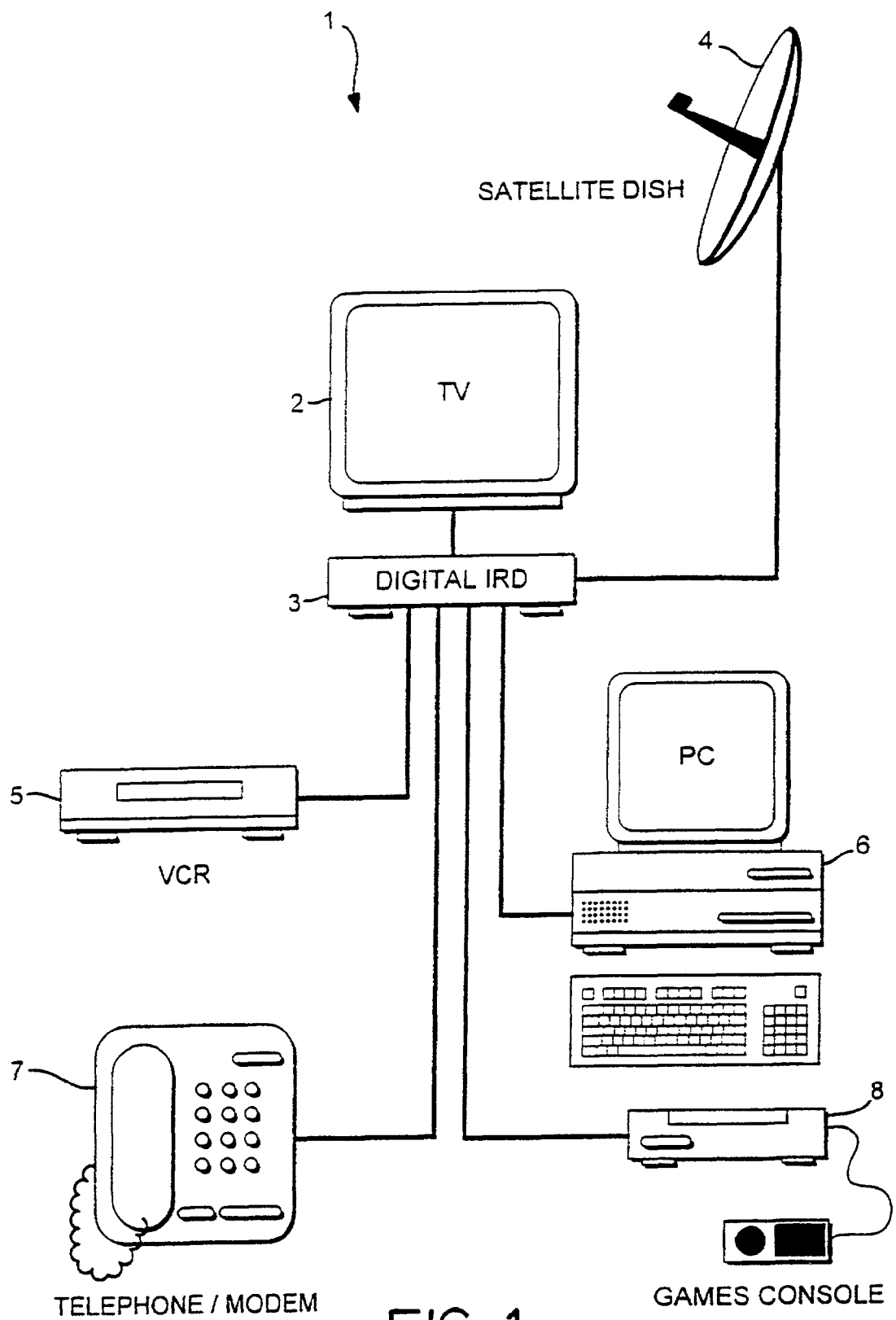
FIG. 1 is a schematic diagram of a television receiver system.

Referring now to FIG. 1 of the accompanying drawings a television receiver system 1 comprises a television (IV) 2, a digital integrated receiver decoder 3 (decoder) connected to receive signals from a satellite dish antenna 4, and a video cassette recorder 5 (VCR), and a modem 7. The system 1 optionally further comprises a personal computer 6 (PC) and a games console 8 each connected via respective lines to the decoder 3. SCART connectors or other standard connectors may be used as appropriate. The decoder 3 acts as an interface between the TV 2 and the VCR 5, PC 6, modem 7 and games console and thus serves to control the system 1.

Receiver/Decoder

Figure 2:
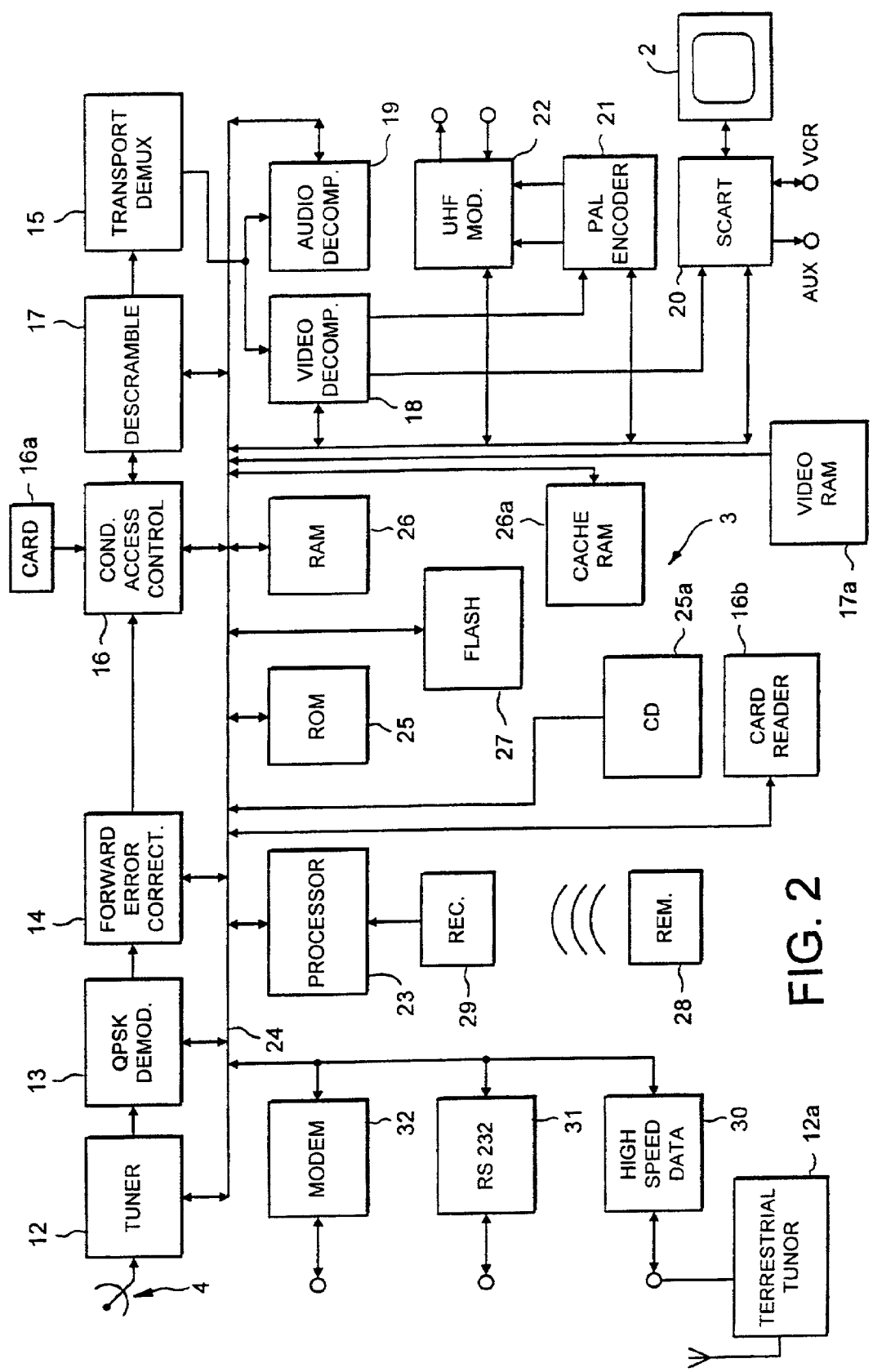
FIG. 2 is a functional block diagram of a satellite decoder.

FIG. 2 of the accompanying drawings shows the decoder 3 in greater detail. The dish antenna receives signals from a satellite (not shown). Signals from the dish antenna 4 are input to a tuner 12 and from there to a quadrature phase shift key (QPSK) demodulator 13. Demodulated signals are error corrected by way of a forward error corrector circuit 14. Satellite (and indeed cable) programmes are usually scrambled to prevent unauthorised access by non-authorised subscribers. The decoder 3 therefore comprises a conditional access control circuit 16 which co-operates with a smart card 16a to determine whether the viewer has subscribed to a particular channel and is therefore authorised to access the channel. Parental control over channel access is also provided, at least in part, by the access control circuit 16. The decoder 3 further comprises a descrambling circuit 17 which is controlled by the access control circuit 16 to enable the descrambling of the signal by authorised subscribers. The received signals comprise digitally encoded data. It is envisaged that the data will be compressed using for example the DVB/MPEG 2 standards which permit both programme data and additional data (for example interactive service data) to be transmitted in a single channel. DVBIMPEG 2 enables high compression ratios to be achieved.

Descrambled data is supplied to a transport/demultiplexor 15 which separates the data into video data, audio data, user services data, programme scheduling data etc. for distribution to various locations within the decoder. Demultiplexed signals are input to a video decompression and processing circuit 18 utilising dedicated video RAM 17a, and an audio decompression and processing circuit 19, operating according to the MPEG standard for example. Decompressed video signals are input to a SCART interface 20 for direct input to the TV 2 and to a PAL encoder 21 where they are encoded into the PAL format for modulation by a UHF modulator 22 for output to the UHF input of the TV if so desired.

The system 3 is controlled by a processor 23 which communicates with the various units of the system via a bus 24. The processor 23 has associated with it ROM 25 (optionally including a CD-ROM drive 25a), RAM 26 (comprising both dynamic RAM and static RAM) and a flash (non-volatile and writable) memory 27. As will be explained in greater detail hereinafter the processor 23 controls operation of the decoder 3 by controlling the tuner 12 to receive signals for the desired channel from the dish antenna 4 and to control demultiplexing, descrambling and decompression so that the desired programme and/or interactive service data is displayed on the screen of the TV 2. Viewer selection of desired programmes and customer services is controlled by way of a remote control unit 28 which in response to viewer manipulation thereof transmits control signals to a receiver 29 for input to the processor 23.

The system 3 further comprises a high-speed data interface 30 and an RS232 interface 31 providing a serial link. The high-speed data interface 30 and the RS232 interface may be connected to the PC 6 and/or the games console 8 of FIG. 1 and/or other digital equipment (not shown). The high speed data interface 30 enables the system 3 to be connected to other devices (not shown) for example to enable reception of services transmitted via other media such as broadband cable and digital terrestrial broadcast. The decoder 3 further comprises a modem interface 32 for connecting to a telephone network.

Figure 3:
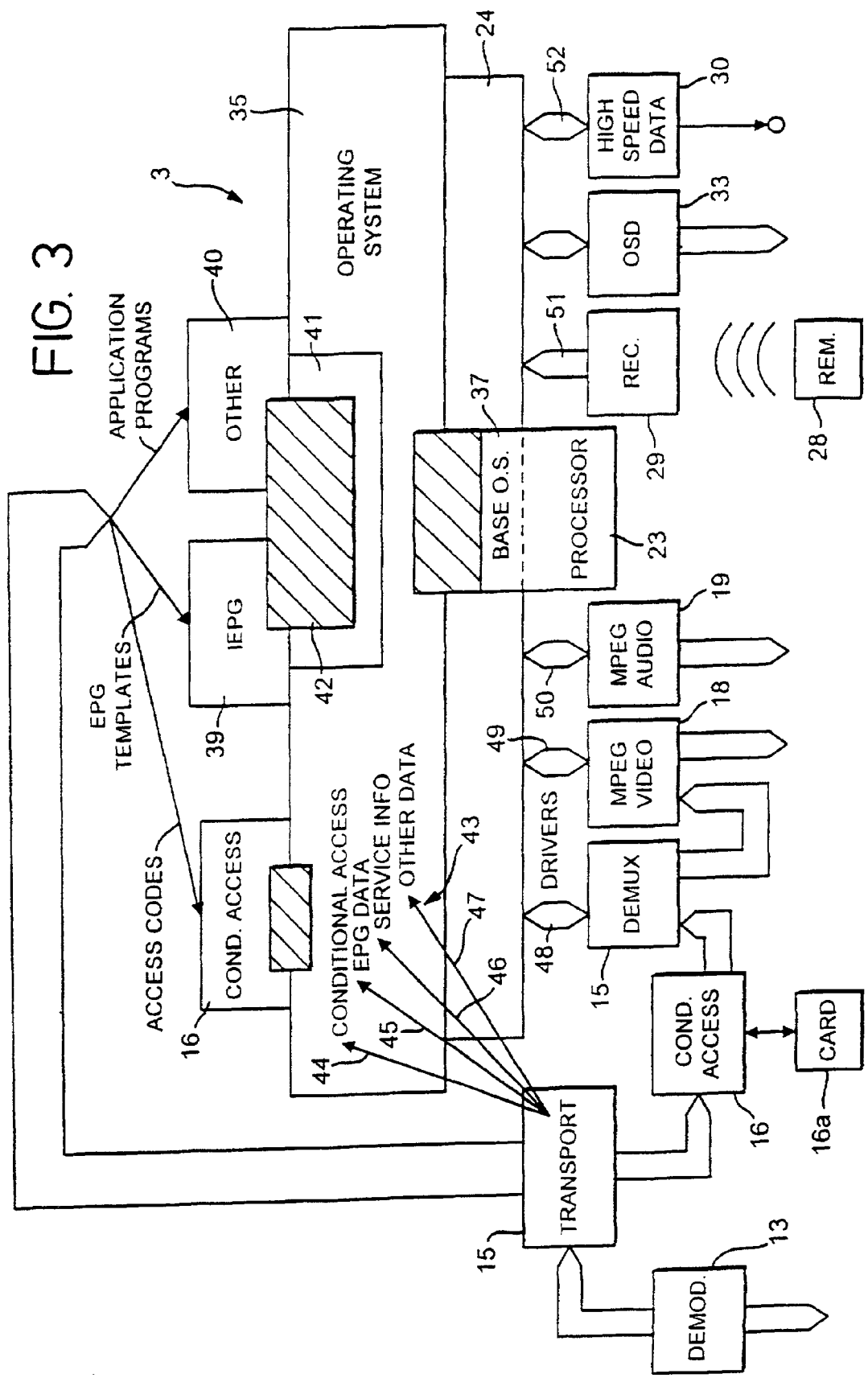
FIG. 3 is a functional diagram showing interaction between hardware and software of the decoder of FIG. 2.

Operation of the decoder 3, especially the processor 23, is controlled by software that makes the processor 23 responsive to control signals from the remote control unit 28 and to data included in the signal received by the dish antenna 4 and in the memory units 25 to 27. A schematic representation of the interaction between hardware and software in the decoder 3 is shown in FIG. 3 of the accompanying drawings. The data in an incoming signal is separated by the transport/demultiplexer 15 into video data and information data. The information data is distributed around the hardware and software, as will be described in greater detail hereinafter. The video data and the audio data is demultiplexed and output in suitable form for supply to a TV by the MPEG video and audio circuits 18 and 19. When information is to be displayed either with or instead of the video, data representing the information is output in suitable form for supply to the TV via an on-screen display (OSD) driver 33 and the video circuit 18. Signals from the OSD driver 33 and the video circuit 18 are combined as appropriate before being supplied to the TV. Operation of the software and hardware of the decoder 3 is based around an operating system 35. The conditional access controller 16 has associated software which interfaces with the operating system. The processor 23 has its own base operating system 37 which interfaces to the decoder operating system 35. Applications such as an intelligent electronic programme guide (IEPG) 39 and other applications 40 including interactive services interface to the operating system 35 via an applications interface 41 and associated application interpreter 42.

The software for conditional access applications such as the intelligent electronic programme guide 39 are installed permanently within non-volatile memory, e.g. the ROM 25, of the decoder 3, but variable information such as new access codes and TV programme scheduling details is updated regularly via signals received from the dish antenna 4. Demodulated signals from the demodulator 13 are input to the transport demultiplexer 15 which examines the data to decide where it should be sent. From time to time significant changes may be made to conditional access codes or to the manner in which the intelligent electronic programme guide (IEPG) 39 displays programme information. Also, programmes for additional applications, say an interactive shopping or banking service for example, are also supplied via the satellite for the decoder. Such application data is routed by the transporter 15 directly to the appropriate areas 40 of the store.

Operating data 43 is supplied on a substantially continuous basis in every channel. The operating data 43 includes conditional access data 44 associated with a channel and/or programmes therein which enables the conditional access controller 16 to determine whether or not access should be allowed to a particular programme by descrambling the data therefor. Additionally, operating data relating to interactive services is transmitted in dedicated interactive service channels which carry control and information data for use by the hardware and software of the processor 23 and the associated memory devices 25 to 27. Thus, the operating data 43 depicted in FIG. 3 also includes interactive service programs and information 46 (for example relating to personal banking services) and indeed any other data 47 required on a substantially continuous or regular basis for the aforementioned interactive services.

The transport/demultiplexer 15 is arranged to supply the operating data 43 to the processor 23. The data is acted upon by the operating system 35, the conditional access and/or other operating software. The processor 23 responds to the data by sending appropriate commands or information to other units within the system. Control data is also transferred between the processor 23 and such units as the demultiplexer 15, the video and audio decompressors 18, 19, the remote control receiver 29 and the high-speed data interface 30 via respective drivers 48 to 52.

The combined hardware and software of the decoder 3 enables the data in received channels to be decoded for display of viewer selected programmes and customer services. The scrambling is controlled on a continuous basis and the decoder can be updated with new descrambling codes as and when required. Data for interactive services is supplied and updated substantially continuously and programmes relating to newly selected interactive services are downloaded into the decoder.

Operation of the decoder 3 in receiving and decoding data representing television programmes and data defining scheduling and other information related to the programmes is described in detail in our International (PCT) patent application published as WO 96/37996, aforementioned. Operation of the decoder 3 in providing interactive services is described in our International (PCT) application published as WO 97/23997, aforementioned.

Within the Digital Video Broadcasting (DVB) standards for digital TV transmission there exists a standard for the transmission of schedule information such that it can be decoded and presented correctly to subscribers in the form of an Electronic Programme Guide (EPG).

This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211—DVB SI Guidelines.

In order to allow broadcasters to utilise any proprietary features of their EPGs the SI standard includes a methodology for extending the format of the service information (SI) stream by the inclusion of private data tables and descriptors.

The above-described decoder 3 is, of course, designed to support the mandatory parts of the SI specification. We have, however, extended considerably certain aspects of the standard as is allowed by the standard. The extended standard will be referred to herein as the XSI specification. Among other things, the XSI includes the following additional features:

1. Compression, regionalisation, ordering and sorting techniques which are used for bandwidth efficient transmission of data;
2. Organization and implementation of data caching;
3. Implementation of time-shifted services.

These additional features unique to the XSI specification, will be described in detail in the following.

Compression

In order to save bandwidth on the transmission medium and memory in the receiver text is compressed. A compression algorithm resident in the decoder 3 uses "dictionaries" which are received from the transmission medium and held in memory, e.g. the RAM 26. The dictionaries may be regarded as look-up tables in which portions of text are stored against table addresses in the form of compressed text strings. Thus, instead of transmitting full text over the transmission medium it is only necessary to transmit the compressed text strings, thereby reducing the bandwidth requirement for the transmission of text over the transmission medium.

Figure 4:
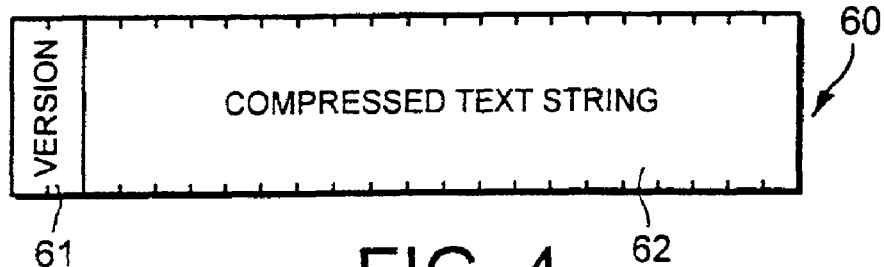
FIG. 4 is a schematic diagram representing a compressed text string.

An example of a compressed text string 60 is shown in FIG. 4 of the accompanying drawings. The string 60 comprises a field 61 of two bits which identifies the version of the dictionary in which the relevant text is held. The string also comprises a field 62 of indefinite length containing data pertaining to compressed text.

Two versions of the dictionary are normally transmitted and a further dictionary may be stored permanently (or for an extended period of time) in the memory of the decoder 3. The transmission of two versions of the dictionary enables the text compression to be optimised according to the data currently being transmitted by allowing the dictionary to be updated over time. Special promotions in one week may no longer be available in the next or may be replaced by another, different promotion causing different dictionaries to be required for full efficiency. The transmission of two dictionaries reduces the amount of memory required to store a dictionary because at any given time only a single dictionary need be stored in the decoder 3. Typically the decoder 3 will be arranged to store in memory the most recently accessed dictionary, be it for the present week or for the next week, and download the other dictionary if necessary the next time data for the dictionary is broadcast (typically every five seconds).

This approach minimises delay, at most, to ten seconds if data for the required dictionary is not in the decoder's memory. It also minimises bandwidth requirements because, instead of transmitting all text for every page of the programme guide each time data for a page is transmitted, each text string is transmitted only one in the dictionaries and the data for each page is reduced to the compressed text strings, such as the compressed text string 60 in FIG. 4. On receipt of data for a page the decoder uses the compressed text strings therein to look up the complete text in the appropriate dictionary and uses the text from the dictionary to reconstruct the full text of the page.

Several text fields are compressed including:

Extended service descriptions (including information about the channel)

Names of each linked event (including the name or title of a programme).

Short Event Names

Extended event descriptions (including a brief synopsis of the programme)

Special event messages (including discounts, say, for early ordering on pay-per-view (PPV) services).

Regionalization

The DVB standard requires broadcasters to register with ETSI so-called "bouquet" identities. Channel line-up information is carried in a Bouquet Association Table (BAT) which is an optional DVB standard table. One way in which services could be regionalized would be to register with ETSI a different Bouquet ID for each region of interest, i.e. one Bouquet ID for England, one for Wales and one for Scotland for example. There are, however, only a limited number of Bouquet IDs available which limits the number of regions that may be defined for a given broadcast company. Another problem is that the number of BATs increases with the number of regions, thereby increasing bandwidth overheads.

Figure 5:
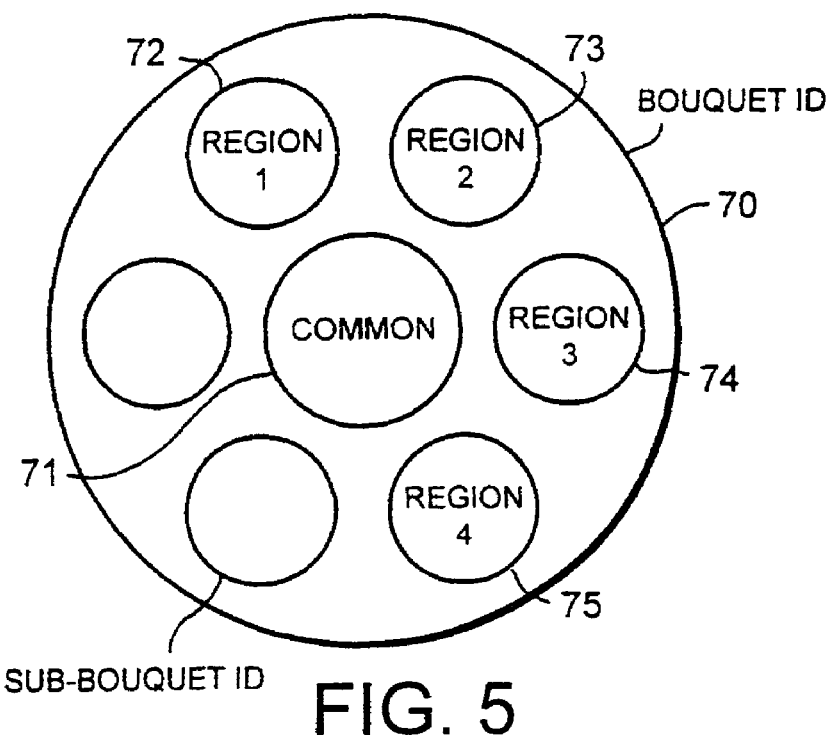
FIG. 5 is a schematic diagram of a bouquet and a plurality of sub-bouquets.

In order to overcome this problem XSI introduces the notion of sub-bouquets. Services are listed within sub-bouquets according to the contents of sub-bouquet descriptors found within the BAT. FIG. 5 of the accompanying drawings shows a bouquet 70 which is identified by a bouquet ID and plural sub-bouquets 71 to 75 each identified by a respective sub-bouquet ID. This information is broadcast in a BAT. One of the sub-bouquets 71 may contain information identifying services that are common to all regions, for example nationwide services such as SKY1, SKY2, BBC1. Other sub-bouquets contain information identifying services that are specific to each region, for example the British ITV companies.

When a subscriber is first connected he or she provides information (such as a post code) which is used to transmit to the decoder relevant bouquet and sub-bouquet IDs to enable the subscriber to receive and store the common services and regionalized services for his region. Each decoder will receive the bouquet ID together with the common sub-bouquet ID and the specific region sub-bouquet ID for the location of the decoder. A default may be set up to enable, say, a non-subscribing viewer to receive free services from within the common and/or specific region sub-bouquets. The regional information may be prestored in the viewing card. It will be appreciated from the foregoing that such a scheme allows significant reduction in the bandwidth used in describing regional channel line-ups.

Ordering

Channels are defined in a predetermined order and are designated a channel number depending on that order. In order to enable the order in which channels appear in the EPC to be different than the channel number order, each sub-bouquet includes order numbers which are separate from the channel number.

All services are assigned a unique service key which is their identifier in XSI. Basically, the service key corresponds to the triplet (original network id, transport stream id, service id) which is the unique identifier of a service as defined in ETSI, ETS 3000 468.

Services are given attributes which vary on a sub-bouquet basis. These attributes are used to inform the EPG application of the display strategy for the service. The attributes are:

Logical channel number (this is the "channel number" as seen by the viewer).

Order number (this number is used to define the order in which services appear in the EPG grid and listings).

Navigation and display indicators (four flags tell whether the service is accessible in channel surf mode, in search & scan mode where listings are displayed over TV viewing, whether the service is to be displayed in the full listings screens and whether it cannot be locked out by parental control).

Sorting

Data broadcast for the EPG includes true information such as the time at which broadcast of a programme is scheduled to start. It would, however, be desirable to be able to sort programmes in another order within the EPG, for example alphabetical order.

Index lists of sorted events by time or alphabetically are computed in the head end, sent over the air as part of the XSI and cached in the decoder 3. This saves computer power in the decoder because sorting listings can be a very CPU intensive job. The sorted indices also convey information such as genre/ sub-genre, PPV post-buying window and other marketing-oriented flags (PPV, Critic's Choice, New Show, Event) that are used for filtering purposes and to support the Box Office functionality.

In addition to the above-described XSI, other improvements have been made to the EPG in the decoder 3. The improvements will be described in the following.

Caching

A cache store 26a (see FIG. 2) is provided in the decoder to enable EPG data to be broadcast and built-up slowly over time, rather than being broadcast continuously. The cache store 26a is a RAM device which may be separate from or part of the RAM store 26. The cache store 26a is shown separate from the RAM store 26 for the purpose of illustration in FIG. 2.

Data caching is also used by the decoder to enable the decoder to be used for a number of different broadcast networks. Typically, the decoder will be required to be able to receive broadcasts from a digital satellite television network and a digital terrestrial television network, and one network will broadcast EPG data at a faster rate than the other. Conceptually, a separate EPG is provided within the decoder for each network. Thus, in the case where the decoder is required to receive both satellite and terrestrial broadcasts, the decoder may be regarded as providing both a satellite EPG and a terrestrial EPG.

The satellite EPG in the decoder is arranged to cache data as and when required taking information from the EPG transponder of the satellite network. Information on the EPG transponder is cycled at a high transmission rate in order that the EPG performs with a reasonable response period.

The bandwidth available for delivery of data to the terrestrial EPG in the digital terrestrial environment is considerably less than that available in the satellite environment. Therefore, unlike in the satellite environment, within the terrestrial environment it is not possible to dedicate one multiplex to transmit the full seven day schedule of EPG data at high speed.

Therefore in order to enable the full schedule of listings to be displayed with a reasonable response rate the full schedule is "trickle" transmitted on all terrestrial multiplexes and the terrestrial EPG stores the complete schedule in the cache memory. This is possible even with the smaller amount of memory available in the set top box because there are a small number of channels carried on the terrestrial network.

As shown in FIG. 2, the decoder is made able to tune to digital terrestrial TV by the addition of terrestrial tuner 12a to the high speed port 30 of the set top box. (Similarly, a terrestrial set top box will be able to tune to digital satellite TV by the addition of a satellite tuner.) Ideally, in this case the EPG resident in the set top box will be capable of seamlessly merging data from the two environments.

An issue that because of memory limitations the combined network set top box will not be capable of storing the entire satellite network schedule in its memory, neither would it be a good use of memory to store the entire terrestrial schedule when only part of the satellite schedule is available.

In order to solve these difficulties when a terrestrial only set top box is upgraded to be capable of tuning to the satellite network then the caching algorithm is changed to be that of a satellite set top box. Thus, the full schedule is no longer held in set top box memory but sections of the schedule are obtained as required from the fast continuous transmission on the EPG transponder of the satellite service. In order for this to work the schedule for the terrestrial listings schedule must also be transmitted in the data transmitted on the satellite EPG transponder.

With this design any satellite capable set top box (i.e. a satellite only system, a satellite system with a terrestrial "side-car", or a terrestrial system with a satellite side-car) will obtain its schedule from the satellite EPG transponder on demand and only caches the piece of the schedule currently in use. A terrestrial only set top box however will have a different caching algorithm and caches the entire schedule for the terrestrial transmission.

The caching strategy can be refined by sending new caching parameters over the air on a per platform basis. A platform is one type of hardware from a certain manufacturer. This enables manufacturers to vary the cost and performance of different models in their ranges by specifying different sizes of cache store for different models. The parameters indicate the schedule depth of the listings that are to be cached and maintained in the decoder as well as the schedule depth of the sorting indexes. Thus models with larger cache stores will be able to store more information allowing the owner to access the information more quickly.

Time-Shifted Services

Figure 6:
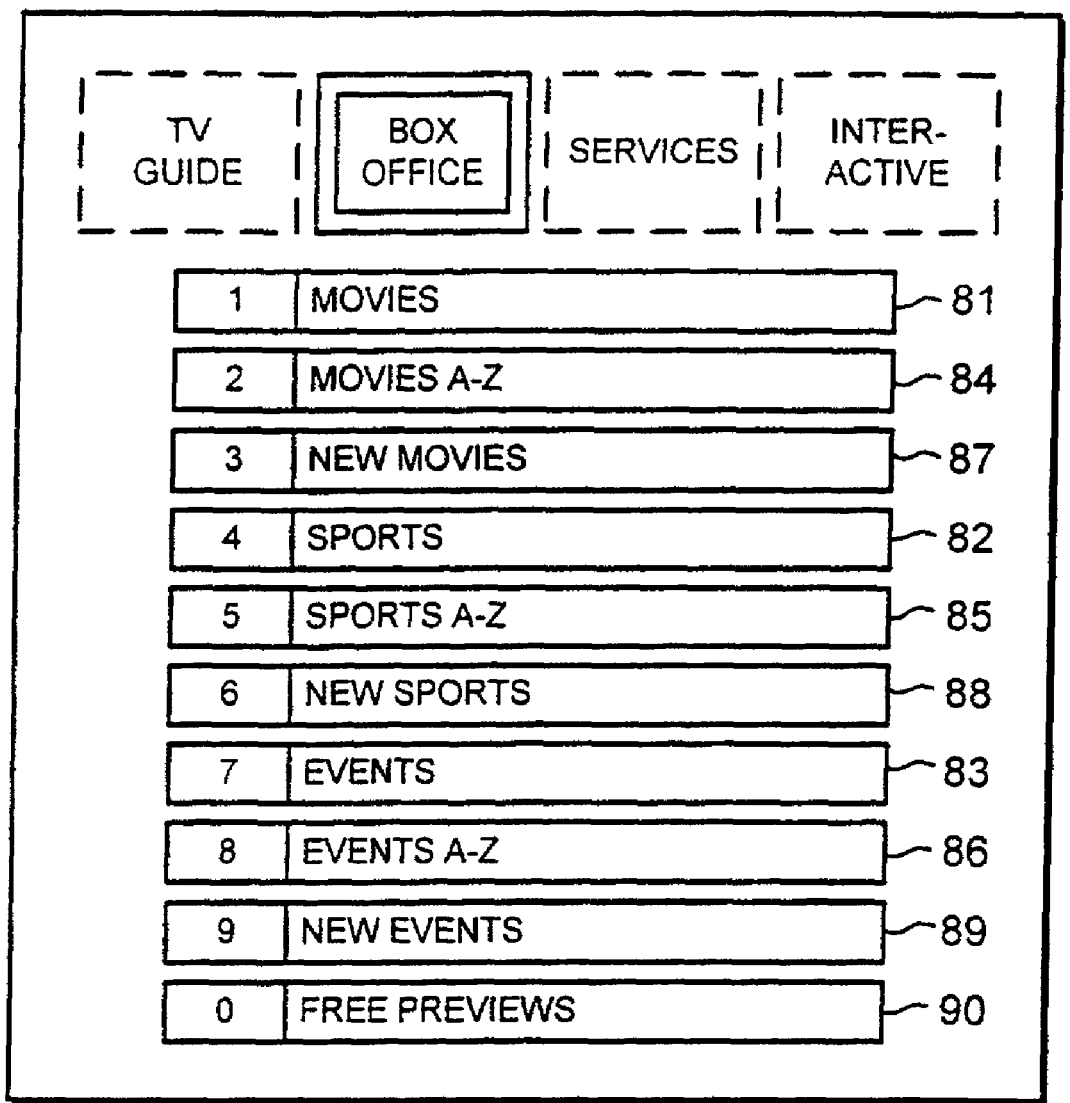
FIG. 6 is a stylized example of a Box Office menu.

Standard DVB SI allows time-shifted services to be defined. By way of example, time-shifted services include the broadcasting of a single movie in different channels at different start times. For example, as shown in FIG. 6, a movie may first be broadcast starting at 6:00 pm on a channel 75, then broadcast of the same movie will start again on a different channel 76 at 6:30 pm, then again at 7:00 pm on channel 77 and so on. According to the standard DVB SI one of the channels, i.e. channel 75, is a reference channel with a reference schedule and all other channels 76, 77 have schedules which are time-shifted versions of the reference schedule. That is, the other channels 76, 77 only differ from the reference channel 75 by the time-shift and cannot have a channel name of their own.

Our XSI provides greater flexibility by allowing each time-shifted channel to have a name which is different than that of the reference channel. Thus, for example, a reference channel called "Box Office" could have time-shifted channels called "Box Office 1", "Box Office 2", "Box Office 3", etc.

The "Box Office"

As discussed within our aforementioned earlier applications, within the EPG there is a dedicated section for the display of Pay-Per-View (PPV) programmes. PPV events include both one-off PPV events and near video on demand PPV events. This is the "Box Office" section of the EPG.

Although the PPV programmes are also listed in the TV Guide section of the EPG, Box Office has been created to encourage subscribers to browse PPV programming. The benefit of having a separate section that lists only PPV events is that it will create a subscriber perception that because all programming listed in this area incurs an extra charge it contains only programmes of the highest value. This encourages the subscriber to use this section of the EPG.

Whilst other EPGs list PPV programming within their normal listings (some allow subscribes to apply filters within the normal listings to find the PPV events), as far as we can establish only the Sky EPG has an entire section dedicated to this purpose.

FIG. 6 of the accompanying drawings shows an example of a Box Office menu 80. The Box Office menu items allow access to listings by Movies, Sport and other programming genres. For each of these genres programmes can be listed in start time order, e.g. "Movies" 81, "Sports" 82 or "Events" 83. Programmes can also be listed by alphabetic order by title, e.g. "Movies A-Z" 84, "Sports A-Z" 85 or "Events A-Z" 86.

Listings of new PPV programmes of each genre are also available, e.g. "New Movies" 87, "New Sports" 88 or "New Events" 89.

Another menu item "Free Previews" 90, when selected, tunes the set top box to a PPV barker channel which continuously promotes PPV programming.

Figure 7:
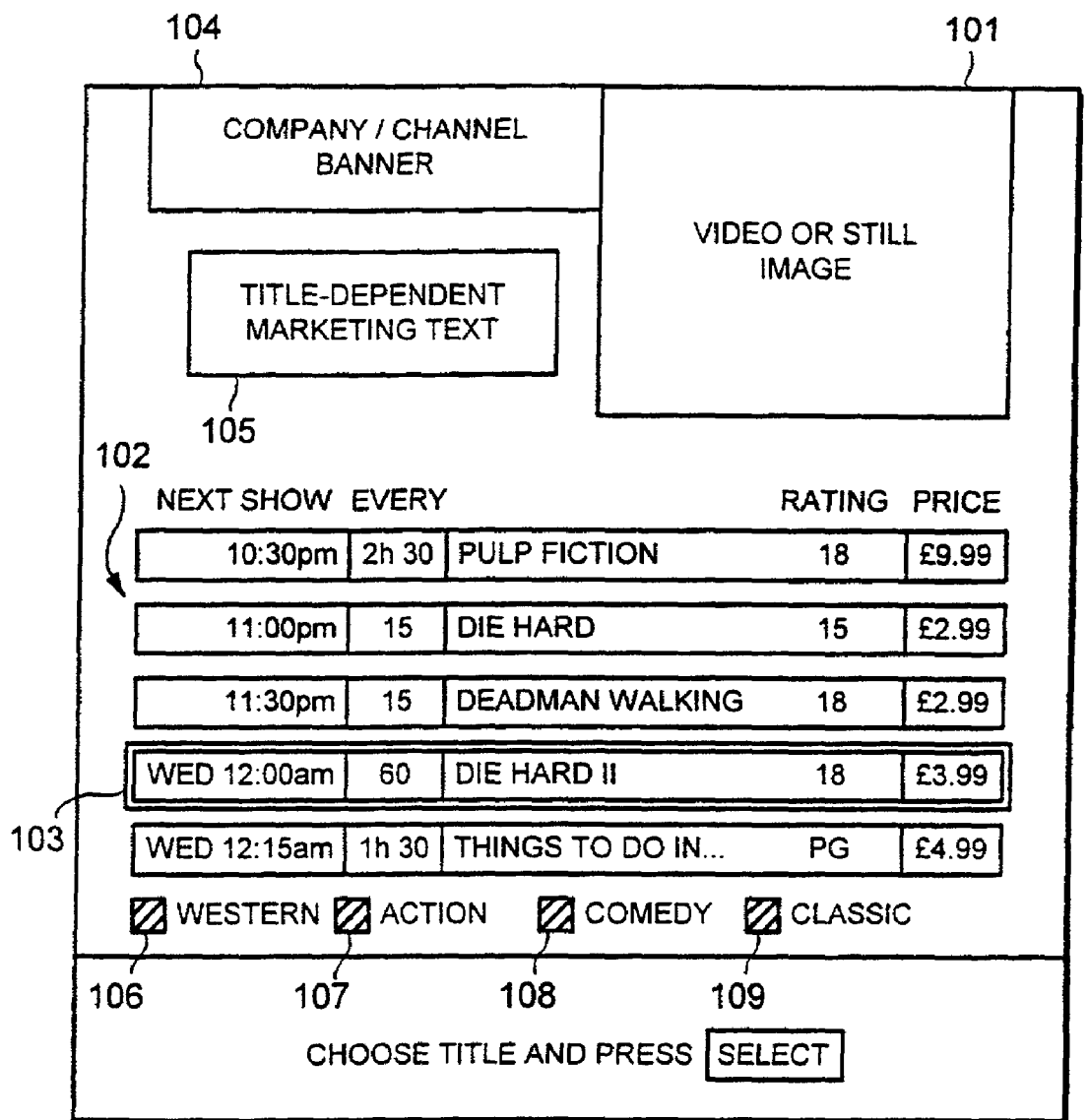
FIG. 7 is a stylized example of a Box Office screen.

FIG. 7 of the accompanying drawings shows an example of a Box Office Movies listing screen 100. Within each Box Office listing screen a section 101 of the screen area is dedicated to a video or still image used to promote PPV programming. This promotion can continue whilst the subscriber is browsing through the listings or booking a PPV event. The video or still image on the section 101 is switchable according to which title is selected from a menu 102 of programmes in the lower half of the screen 100. In FIG. 7 the bar 103 for the movie "Die Hard II" is highlighted and a video or still image representing that movie would be displayed in the section 101. Thus, as the subscriber browses through the Box Office listings the video/still inset will change to denote the programme selected—the video/still being a trailer or promotion for the particular title.

In order to reduce bandwidth any video image is transmitted at a reduced size and is scaled up to the required size by the set top box as described in our aforementioned patent applications.

As a further advancement the video or still image is itself schedulable. This enables the high bandwidth required for video promotions to be used to greatest effect. For example, during the daytime PPV titles targeted at families and children may be scheduled for video promotions. However, in peak viewing time stills may be used to promote these events, and the video promotions allocated to titles appealing to a more mature audience.

Other areas 104, 105 of the screen 100 are given over to the display of a company and/or channel banner and text which may change depending on which movie is highlighted in the menu 102. Icons 106 to 109 below the menu 102 enable the user to select movie listings by movie type, e.g. "Western" movies, "Action" movies", "Comedy" movies or "Classic" movies. Selection of one of the icons 106 to 109 causes the EPG to apply the aforementioned filtering to the movie information before it is displayed on the screen 100.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

The invention claimed is:

1. A receiver for receiving television signals in a plurality of channels each defining a television programme, wherein at least a signal in one of the channels includes compressed program schedule data defining broadcast events in the channels, and for producing output signals defining an image of the broadcast events in the programme schedule for displaying on a television screen, the receiver comprising:
   means for receiving data defining two versions of a dictionary representing text portions,
   means for expanding the programme schedule data by identifying corresponding text portions in the dictionary,
   means for determining in which version of the dictionary the corresponding text portion is stored,
   means for constructing the image of events using the identified corresponding text portions, and
   means for storing only the most recently accessed version of the dictionary.

2. A receiver as claimed in claim 1, wherein the text portions comprise an extended service description.

3. A receiver as claimed in claim 1, wherein the text portions comprise an event name.

4. A receiver as claimed in claim 1, wherein the text portions comprise a short event name.

5. A receiver as claimed in claim 1, wherein the text portions comprise an extended event description.

6. A receiver as claimed in claim 1, wherein the text portions comprise a special event message.

7. A receiver as claimed in claim 1, comprising means for receiving the data of the other version of the dictionary and means for replacing the data of the one version of the dictionary in the storing means with the data of the other version of the dictionary when the data for the text portion is determined to be stored in the other version of the dictionary.

8. A receiver as claimed in claim 1, further comprising means for storing a default dictionary.

9. A receiver as claimed in claim 2, wherein the text portions comprise an event name.

10. A receiver as claimed in claim 2, wherein the text portions comprise a short event name.

11. A receiver as claimed in claim 3, wherein the text portions comprise a short event name.

12. A receiver as claimed in claim 9, wherein the text portions comprise a short event name.

13. A receiver as claimed in claim 1, wherein the most-recently accessed version of the dictionary is stored in a volatile memory.

14. A receiver as claimed in claim 13, wherein the data defines a further dictionary that is stored in a non-volatile memory.

15. A receiver for receiving television signals in a first plurality of channels broadcast in a first broadcast network that include programme schedule data for the first network, for receiving television signals in a second plurality of channels broadcast in a second broadcast network that include programme schedule data for the second network, and for receiving programme schedule data broadcast in the first network at a faster rate than in the second network, the receiver comprising:
   a cache store for storing a portion of programme schedule data for the first and/or the second network transmitted from time to time in at least one of the channels broadcast in the first network and/or the second network,
   means for decoding the data in the cache store for display of a programme schedule of the first or second broadcast network, and
   means for receiving and decoding additional programme schedule data from the first network for either of the first or second broadcast network, in response to a user request.

16. A receiver as claimed in claim 15, wherein the data stored in the cache store is updated when new data is transmitted in the first or second network.

17. A receiver as claimed in claim 15, wherein the broadcast programme schedule data comprises depth data for specific models of receiver, the receiver being arranged to receive depth data pertaining thereto, and the amount of data stored in the cache store is dependent on the depth data.

18. A receiver as claimed in claim 16, wherein the broadcast programme schedule data comprises depth data for specific models of receiver, the receiver being arranged to receive depth data pertaining thereto, and the amount of data stored in the cache store is dependent on the depth data.

* * * * *